UNITED STATES PATENT OFFICE.

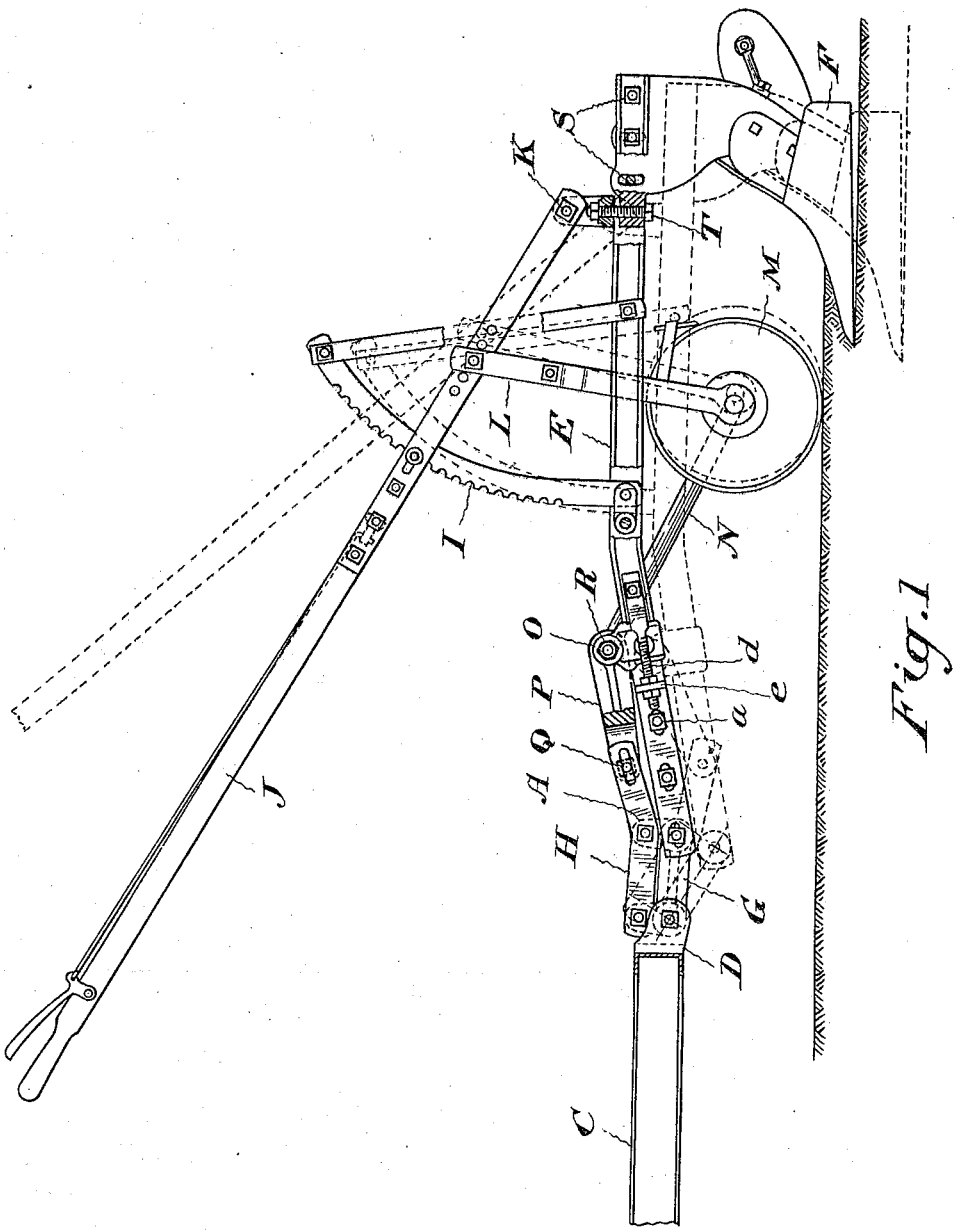

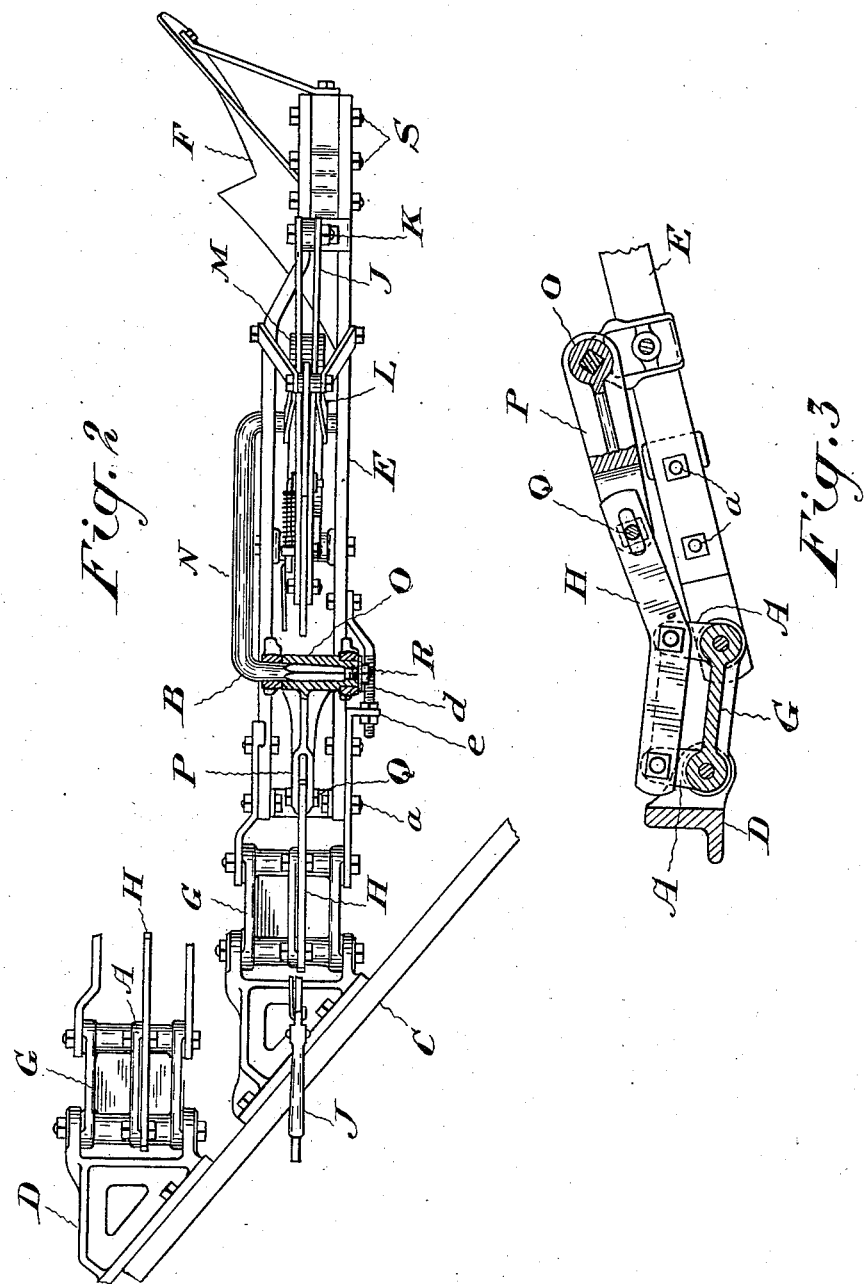

PAUL A. VAN SICKLE, OF BRANTFORD, ONTARIO, CANADA, ASSIGNOR TO VERITY PLOW COMPANY, LIMITED, OF BRANTFORD, CANADA.

GANG-PLOW.

1,009,269.  Specification of Letters Patent.  Patented Nov. 21, 1911.

Application filed December 27, 1910. Serial No. 599,323.

*To all whom it may concern:*

Be it known that I, PAUL A. VAN SICKLE, of the city of Brantford, in the county of Brant, Province of Ontario, Canada, have invented certain new and useful Improvements in Gang-Plows, of which the following is a specification.

This invention relates to a class of gang plow particularly designed for use with traction engines. In such plows it is the usual practice to make each plow adjustable for depth of furrow by providing it with an adjustable clevis, and also by providing means actuated by a set screw for producing a fine adjustment of the angle of the plow to the beam. This adjustment cannot be made while the plow is under way, and my object is to devise means whereby the plows may be adjusted for depth of furrow and pitch almost instantly and while the plow is in use and without the use of stationary frames above the gangs.

I attain my object by constructions hereinafter described and illustrated in the accompanying drawing in which—

Figure 1 is a side elevation of a part of a gang plow constructed in accordance with my invention. Fig. 2 is a plan view of the plow shown in Fig. 1. Fig. 3 is a sectional detail of part of the adjusting mechanism.

In the drawings like letters of reference indicate corresponding parts in the different figures.

In Figs. 1 and 2 I show part of the triangular main frame of the plow which is in general of ordinary construction. To the inclined rear bar C of the main frame the plow beams are connected. For this purpose brackets D are secured to the bar C. Each plow beam E is preferably double as shown, and the plow F is secured to the plow beam in the manner I will hereinafter describe.

The forward ends of each plow beam are pivotally connected to a link G, which is pivotally connected with one of the brackets D. To each link G is rigidly connected a rearwardly extending arm H, preferably bolted to the lugs A formed on the link. On each plow beam is secured a notched quadrant I. A lever J is fulcrumed on the plow beam at K and is adapted in the usual way to engage the notched quadrant I. A link L is pivotally connected to this lever and in the lower end of the link is journaled a gage wheel M. A pivoted link N extends from the lower end of the link L, preferably outside the plow beam and is secured to a rock spindle O journaled on the plow beam. On reference to Figs. 2 and 3 the preferred form of connection will be seen. The end B of the link is bent at right angles, squared and tapered to fit a similarly shaped socket in the rock spindle O. The end of the part B projects through the socket and is threaded to receive the nut R, which secures the parts together. An arm P is also rigidly secured to this rock spindle, preferably by being formed integral therewith, and is provided at its end with a bolt Q sliding in a slot in the end of the arm H. The result of this construction is that if the lever J be raised the plow beam E is lowered, as indicated in dotted lines in Fig. 1. As the gage wheel remains in contact with the ground, the rock spindle O is rocked and with it the arm P, which by means of its connection with the arm H, tilts down the link G thus lowering the forward end of the plow beam, which adjustment is of course equivalent to adjusting the forward end of the plow beam at the clevis as is the usual practice. It will be seen that by this arrangement I have devised means for accomplishing the same effect attained by the adjustment of a clevis and through the medium of a hand lever which is readily and quickly operated at any time from the platform which is usually carried by the main frame.

It will be noted that for adjustment purposes a plurality of holes are provided in the lever J whereby it may be connected with the link L so that the movement of the plow beam for any given movement of the lever may be varied as desired.

A fine adjustment of the inclination of the plow to the plow beam may be obtained in the following manner: The shank of each plow is secured between the parts of the plow beam by means of the bolts S. The rearward bolt passes through a round hole in the plow while the forward bolts work in slots (see Fig. 1). When the bolts are loosened the plow can be rocked up and down to a limited extent.

To regulate the adjustment I provide a vertical bolt T passing through a bar on the plow beam and through a lug on the plow.

By adjusting this bolt the plow can be adjusted as desired, and the bolts S tightened up to hold everything solid.

To adjust the plow in proper parallelism to the line of draft I divide the plow beam at one or both sides and secure the parts together by the bolts $a$ working through slots as indicated in Fig. 1. A threaded stem $d$ secured to one part passes through a lug $e$ on the other part and is set up thereto by means of suitable nuts. By adjusting these nuts the plow beam may be adjusted as desired.

It will be understood of course that the details of construction may be considerably departed from while retaining the same principle of operation and such variations will fall within the scope of my invention.

What I claim as my invention is:—

1. In a gang plow a main frame; a plow beam; a draft link pivotally connected with the forward end of the plow beam and the frame; a gage wheel supported from the plow beam behind the link; and means supported on the plow beam itself and connected with said draft link and the gage wheel for vertically adjusting the plow beam and gage wheel relative to one another and simultaneously rocking the aforesaid link to similarly adjust the forward end of the plow beam.

2. In a gang plow, a main frame; a plow beam; a vertically movable connection between the frame and plow beam; a gage wheel supported from the plow beam behind the point of engagement between said connection and the plow beam; and means, supported on the plow beam itself and connected with said vertically movable connection and the gage wheel, for vertically and simultaneously adjusting the forward end of the plow beam relative to the frame and the rearward end relative to the gage wheel.

3. In a gang plow a main frame; a link pivotally connected with the forward end of the plow beam and the frame; an arm connected with said link; a gage wheel supported from the plow beam behind the link; and means supported on the plow beam itself for vertically adjusting the plow beam and gage wheel relative to one another and simultaneously rocking the aforesaid arm to similarly adjust the forward end of the plow beam.

4. In a gang plow a main frame; a link pivotally connected with the forward end of the plow beam and the frame; an arm connected with said link; a rock arm pivoted on the plow beam and having an operative engagement with the arm of the link; a gage wheel; and means supported on the plow beam for vertically adjusting the plow beam and gage wheel relative to one another and simultaneously rocking the aforesaid rock arm to similarly adjust the forward end of the plow beam.

5. In a gang plow a main frame; a link pivotally connected with the forward end of the plow beam and the frame; an arm connected with said link; a rock arm pivoted on the plow beam and having an operative engagement with the arm of the link; a gage wheel; a link defining the longitudinal position of the gage wheel and rigidly connected with the rock arm; and means for vertically adjusting the plow beam and gage wheel relative to one another.

6. In a gang plow a main frame; a link pivotally connected with the forward end of the plow beam and the frame; an arm connected with said link; a rock arm pivoted on the plow beam and having an operative engagement with the arm of the link; a gage wheel; a link defining the longitudinal position of the gage wheel and rigidly connected with the rock arm; and means for vertically adjusting the plow beam and gage wheel relative to one another comprising a link at the lower end of which the gage wheel is journaled, and a hand lever fulcrumed on the plow beam to which the upper end of said link is connected.

Brantford, this 22nd day of December, 1910.

PAUL A. VAN SICKLE.

Signed in the presence of—
 JAMES HARLEY,
 ARCH. M. HARLEY.

---

Copies of this patent may be obtained for five cents each, by addressing the "Commissioner of Patents, Washington, D. C."